(12) United States Patent
Yamada et al.

(10) Patent No.: US 9,109,586 B2
(45) Date of Patent: Aug. 18, 2015

(54) ELECTRO-HYDRAULIC DRIVE SYSTEM FOR A WORK MACHINE

(75) Inventors: Masahiro Yamada, Kobe (JP); Ryo Yamamoto, Kobe (JP); Yukito Imamura, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 285 days.

(21) Appl. No.: 13/816,337

(22) PCT Filed: Jul. 13, 2011

(86) PCT No.: PCT/JP2011/004017
§ 371 (c)(1),
(2), (4) Date: Mar. 27, 2013

(87) PCT Pub. No.: WO2012/023231
PCT Pub. Date: Feb. 23, 2012

(65) Prior Publication Data
US 2013/0180247 A1    Jul. 18, 2013

(30) Foreign Application Priority Data
Aug. 18, 2010 (JP) .................................. 2010-183428

(51) Int. Cl.
*F16D 31/02* (2006.01)
*F01B 21/04* (2006.01)
(Continued)

(52) U.S. Cl.
CPC . *F04B 17/03* (2013.01); *B60K 6/20* (2013.01); *E02F 9/123* (2013.01); *E02F 9/2075* (2013.01);
(Continued)

(58) Field of Classification Search
CPC .... F04B 17/03; F04B 49/002; F16H 61/4148; E02F 9/2075; E02F 9/2217; E02F 9/2296; E02F 9/123; E02F 9/2095; H02K 7/1807; H02K 7/00; H02P 3/14; F15B 21/14; F15B 2211/6336; F15B 2211/20523; F15B 2211/20515; F15B 2211/20546; F15B 2211/633; F15B 2211/50527; F15B 2211/88; B60K 6/20; F03C 1/0678; F03C 1/26; F03C 1/0636; F01C 13/04; B60W 2300/17
USPC ........... 60/431, 445, 448, 449, 451, 464, 487, 60/489, 698, 706, 709, 711, 716
See application file for complete search history.

(56) References Cited

U.S. PATENT DOCUMENTS 6,078,855 A * 6/2000 Kinugawa et al. .............. 701/50
6,851,207 B2 * 2/2005 Yoshimatsu .................... 37/348
(Continued)

FOREIGN PATENT DOCUMENTS

JP    A-10-42587    2/1998
JP    A-10-103112    4/1998
(Continued)

OTHER PUBLICATIONS
Aug. 16, 2011 International Search Report issued in International Application No. PCT/JP2011/004017 (with translation).

*Primary Examiner* — Hoang Nguyen
(74) *Attorney, Agent, or Firm* — Oliff PLC

(57) ABSTRACT

An electro-hydraulic drive system for a work machine which drives an upper rotary body by controlling a flow rate of a hydraulic fluid by a control valve, includes an electro-hydraulic pump including a hydraulic pump driven by an engine, and a first electric motor, and an electro-hydraulic motor including a hydraulic motor rotated by the hydraulic oil supplied from the electro-hydraulic pump, and a second electric motor, and a controller which determines an operating state of the first electric motor and an operating state of the second electric motor based on a load of the electro-hydraulic pump and a load of the electro-hydraulic motor, and is able to perform an efficient operation by using a hydraulic pressure (fluid pressure) and electric power.

7 Claims, 5 Drawing Sheets

(51) Int. Cl.

| | | |
|---|---|---|
| *F04B 17/03* | (2006.01) | |
| *B60K 6/20* | (2007.10) | |
| *E02F 9/12* | (2006.01) | |
| *E02F 9/20* | (2006.01) | |
| *F03C 1/06* | (2006.01) | |
| *F03C 1/40* | (2006.01) | |
| *F03C 1/26* | (2006.01) | |
| *F04B 49/00* | (2006.01) | |
| *F15B 21/14* | (2006.01) | |
| *H02K 7/00* | (2006.01) | |
| *H02K 7/18* | (2006.01) | |
| *H02P 3/14* | (2006.01) | |
| *E02F 9/22* | (2006.01) | |
| *F16H 61/4148* | (2010.01) | |
| *F01C 13/04* | (2006.01) | |

(52) U.S. Cl.
CPC ............ *E02F 9/2095* (2013.01); *E02F 9/2217* (2013.01); *E02F 9/2296* (2013.01); *F03C 1/0636* (2013.01); *F03C 1/0678* (2013.01); *F03C 1/26* (2013.01); *F04B 49/002* (2013.01); *F15B 21/14* (2013.01); *F16H 61/4148* (2013.01); *H02K 7/00* (2013.01); *H02K 7/1807* (2013.01); *H02P 3/14* (2013.01); *B60W 2300/17* (2013.01); *F01C 13/04* (2013.01); *F15B 2211/20515* (2013.01); *F15B 2211/20523* (2013.01); *F15B 2211/20546* (2013.01); *F15B 2211/50527* (2013.01); *F15B 2211/633* (2013.01); *F15B 2211/6336* (2013.01); *F15B 2211/88* (2013.01)

(56) References Cited

U.S. PATENT DOCUMENTS

| | | | |
|---|---|---|---|
| 6,989,640 B2 * | 1/2006 | Yoshimatsu | .................... 318/34 |
| 7,086,226 B2 * | 8/2006 | Oguri | .............................. 60/414 |
| 2002/0125052 A1 | 9/2002 | Naruse et al. | |
| 2007/0187180 A1 | 8/2007 | Kagoshima et al. | |
| 2008/0317574 A1 | 12/2008 | Moriya et al. | |
| 2011/0001370 A1 | 1/2011 | Yamada et al. | |

FOREIGN PATENT DOCUMENTS

| | | |
|---|---|---|
| JP | A-2002-275945 | 9/2002 |
| JP | A-2003-009308 | 1/2003 |
| JP | A-2004-124381 | 4/2004 |
| JP | A-2004-360216 | 12/2004 |
| JP | A-2005-237178 | 9/2005 |
| JP | A-2005-290882 | 10/2005 |
| JP | A-2007-056998 | 3/2007 |
| JP | A-2007-218003 | 8/2007 |
| JP | A-2008-291522 | 12/2008 |
| JP | A-2009-209725 | 9/2009 |
| JP | A-2011-144531 | 7/2011 |

* cited by examiner

ELECTRO-HYDRAULIC DRIVE SYSTEM FOR A WORK MACHINE

TECHNICAL FIELD

The present invention relates to an electro-hydraulic drive system for driving a structure body mounted to a work machine or the like, by using a fluid-pressure (hydraulic) motor and an electric motor. For example, the present invention relates to an electro-hydraulic drive system using a hydraulic motor and the electric motor.

BACKGROUND ART

Conventionally, power machineries such as hydraulic shovels, cranes, wheel loaders, and bulldozers (in specification and claims, these power machineries are collectively referred to as "work machines") have been employed in various fields. For example, a hydraulic shovel will be described. The hydraulic shovel is configured such that an upper rotary body (structure body) is mounted to an upper portion of a lower travelling object, and the upper rotary body includes an engine, a driver seat, an arm attached with a bucket at a tip end thereof, a boom coupled to the arm, etc. Thus, the hydraulic shovel has a great weight. The upper rotary body is rotatable at the upper portion of the lower travelling object by operating a remote control valve provided in the driver seat during a work, and the bucket attached to the tip end of the arm performs various kinds of works.

In recent years, as one example of the work machines, there is proposed a work machine including an electric motor as a drive device for driving the upper rotary body, etc.

For example, there is a work machine in which a hydraulic pump and a generator/electric motor are mounted in parallel to a reduction gear device which is driven by an engine as a driving power source and they are driven, a hydraulic actuator is driven by a hydraulic oil from the hydraulic pump, electric power generated in the generator is stored in a battery, and the generator/electric motor is operated as an electric motor as necessary (e.g., see Patent Literatures 1, 2).

As another prior art, there is a work machine in which a hydraulic pump is attached to an engine as a driving power source, the hydraulic pump is provided with a generator/electric motor via a reduction gear device or a coupling, a hydraulic cylinder or a travelling hydraulic motor is driven by a hydraulic oil from the hydraulic pump driven by a driving power of the engine, and electric power generated in the generator is stored in a battery and used to rotate the rotary electric motor (e.g., see Patent Literatures 2, 3).

As another prior art, there is a work machine in which an engine as a driving power source and a generator are integral with each other, a hydraulic cylinder or the like are driven by a hydraulic oil from a hydraulic pump driven via the generator, and an upper rotary body is driven by the electric motor (e.g., Patent Literature 4).

CITATION LISTS

Patent Literature

Patent Literature 1: Japanese Laid-Open Patent Application Publication No. 2005-237178
Patent Literature 2: Japanese Laid-Open Patent Application Publication No. 2003-9308
Patent Literature 3: Japanese Laid-Open Patent Application Publication No. 2007-218003
Patent Literature 4: Japanese Laid-Open Patent Application Publication No. 2002-275945

SUMMARY OF THE INVENTION

Technical Problem

However, in the Patent Literature 1, there is a need for the reduction gear device of a large-size for driving the hydraulic pump and the generator/electric motor, which results in an increase in the size of the overall apparatus and a complex configuration. Because of this, it is difficult to ensure a connection workability of device and reliability. In addition, components of the devices are great in number, which requires high manufacturing cost, etc.

In the case of the Patent Literatures 2 and 3, the coupling and the like are required between the engine and the hydraulic pump or the generator/electric motor, which results in an increase in the size of the overall apparatus and complex configuration. Because of this, it is difficult to ensure a connection workability of devices and reliability, and high manufacturing cost, etc. are required.

In the case of Patent Literature 4, although the engine and the generator are integral with each other to reduce a size, the engine integral with the generator is a dedicated component. It is therefore necessary to newly design a drive device and manufacture components for every individual work machine, which requires high manufacturing cost and a long manufacturing time.

Moreover, in the above prior arts, each of the work machines is configured such that the rotary body as the structure body of the work machine is driven only by the electric motor. In some cases, the rotary body cannot be rotated unless the generator is driven by the driving power source to generate the electric power to be stored in the battery. This requires a long power generation time in the driving power source. Under the circumstances, it is difficult to efficiently utilize the driving power in the overall work machine.

Solution to Problem

An object of the present invention is to provide an electro-hydraulic drive system for a work machine which includes a hydraulic motor and an electric motor for driving a structure body of a work machine, and further includes a hydraulic pump and an electric motor which are driven by a driving power source, to provide an efficient operation using a hydraulic pressure (fluid pressure) and electric power and achieve cost reduction.

To achieve the above described object, according to the present invention, there is provided an electro-hydraulic drive system for a work machine which drives a structure body by controlling a flow rate of a hydraulic fluid by a control valve, comprising: a supply device which includes a hydraulic pump driven by a driving power source, and a first electric motor, and supplies the hydraulic fluid; a drive device which includes a hydraulic motor rotated by the hydraulic fluid supplied from the supply device, and a second electric motor, and drives the support body; and a controller which decides an operating state of the first electric motor and an operating state of the second electric motor, based on a load of the supply device and a load of the drive device. In specification and claims, the term "operating state of the electric motor" means a state in which the electric motor operates as "drive unit" or a state in which the electric motor operates as "generator". This allows the structure body of the work machine to be driven by a hydraulic pressure (fluid pressure) supplied from the hydraulic pump driven by the driving power source to the hydraulic motor via the control valve, and power generation or driving to be performed efficiently by using the first electric motor and the second electric motor. Thus, it becomes possible to construct the electro-hydraulic drive system efficiently using the electric power and the hydraulic pressure (fluid pressure).

The first electric motor may have a generator function of converting driving power transmitted from the driving power source into electric energy, and a drive unit function of assisting driving of the hydraulic pump by utilizing the electric energy; and the controller may perform control to operate the first electric motor as a generator or a drive unit based on a state of charge in a charging unit which stores electric power generated by the generator function and an operating state of the first electric motor. Since the first electric motor can operate as the drive unit or the generator according to the state of charge in the charging unit and the operating state of the first electric motor, efficient operation can be implemented.

The second electric motor may have a generator function of converting inertia energy into the electric energy during deceleration of the hydraulic motor and a drive unit function of assisting driving of the hydraulic motor by utilizing the electric energy; and the controller may perform control to operate the second electric motor as a generator or a drive unit based on a state of charge in the charging unit which stores the electric power generated by the generator function and an operating state of the second electric motor. Since the second electric motor can operate as the drive unit or the generator according to the state of charge in the charging unit and the operating state of the second electric motor, efficient operation can be implemented. In addition, since one or both of the first electric motor of the supply device and the second electric motor of the drive device can operate as the generator(s), the energy can be recovered efficiently.

The drive device may be configured such that the hydraulic motor and the second electric motor are integral with each other; the second electric motor may include a rotor connected to a rotary shaft of the hydraulic motor and a stator disposed on an outer periphery of the rotor; and the rotor may be disposed to surround an outer periphery of a casing of the hydraulic motor such that the rotor is spaced apart a predetermined gap from the outer periphery of the casing; and a bearing for supporting the rotor on the casing and a seal member for sealing the gap between the rotor and the casing may be disposed between the rotor and the casing. In accordance with this configuration, since the second electric motor is disposed at the outer periphery of the hydraulic motor, the drive device can be configured compactly. In addition, since the seal member seals the gap between the outer periphery of the casing of the hydraulic motor and the rotor of the second electric motor which is disposed to be spaced apart from the outer periphery of the casing, it becomes possible to prevent lubricating oil or the like from leaking from the hydraulic motor into the second electric motor, and hence prevent degradation or the like of performance of the second electric motor.

The supply device may be configured such that the hydraulic pump and the first electric motor are integral with each other. In accordance with this configuration, the driving power source can be provided with the supply device including the hydraulic pump and the first electric motor without significantly changing the conventional mounting structure for connecting the hydraulic pump to the driving power source. In addition, the supply device including the hydraulic pump and the first electric motor can have an integral configuration and can be small-sized. As a result, cost can be reduced.

Advantageous Effects of the Invention

In accordance with the present invention, it is possible to construct a drive system for a work machine which is capable of operating efficiently by a hydraulic pressure (fluid pressure) and electric power by using a hydraulic motor and an electric motor which drive a structure body of the work machine, and a hydraulic pump and an electric motor which are driven by a driving power source.

In addition, since the hydraulic motor and the electric motor have an integral configuration, or the hydraulic pump and the electric motor have an integral configuration, the device can be reduced in size and cost can be reduced.

DESCRIPTION OF THE EMBODIMENTS

Hereinafter, an embodiment of the present invention will be described with reference to the drawings. In the embodiment described below, as an example of "hydraulic fluid", "hydraulic oil" will be described. As an example of a work machine, a hydraulic shovel including a hydraulic cylinder, a traveling hydraulic motor, an upper rotary body, etc. will be described. Further, in the embodiment, an electro-hydraulic drive system including an electro-hydraulic integrated supply device (hereinafter referred to as "electro-hydraulic pump") in which a hydraulic pump is integral with a first electric motor, and an electro-hydraulic integrated drive device (hereinafter referred to as "electro-hydraulic motor") in which a hydraulic pump is integral with a second electric motor, will be described, for example.

Figure 1:
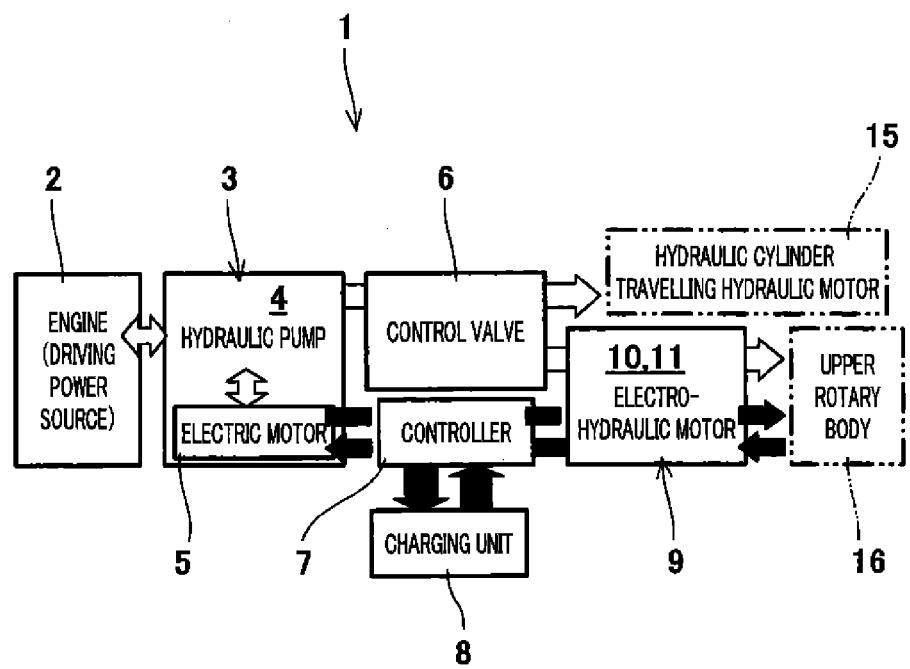
FIG. 1 is a block diagram showing an electro-hydraulic drive system for a work machine of the present invention.

As shown in FIG. 1, an electro-hydraulic drive system 1 of the present embodiment includes an engine 2 which is a driving power source, an electro-hydraulic pump 3 driven by the engine 2, a control valve 6 for controlling a flow rate of the hydraulic oil discharged from a hydraulic pump 4 of the electro-hydraulic pump 3, a first electric motor 5 of the electro-hydraulic pump 3, a charging unit 8 charged with electric power generated in the first electric generator 5 via a controller 7, and an electro-hydraulic motor 9 (electro-hydraulic rotary motor) which is driven by the hydraulic oil from the control valve 6 and the electric power supplied via the controller 7. As will be described later, the electro-hydraulic motor 9 includes a hydraulic motor 10 driven by the hydraulic oil from the control valve 6 and a second electric motor 11 driven by the electric power supplied via the controller 7.

The hydraulic oil supplied from the electro-hydraulic pump 3 is supplied via the control valve 6 to, for example, a hydraulic cylinder for extension and contraction of a boom, a driving hydraulic motor 15, etc., to drive them. The electro-hydraulic motor 9 is also driven by the hydraulic oil supplied via the control valve 6 and rotates an upper rotary body 16.

The electro-hydraulic motor 9 has a function of generating electric power by utilizing inertia of the upper rotary body, etc. The generated electric power is charged into the charging unit 8 via the controller 7.

The electric power charged into the charging unit 8 is utilized as an assist driving power for driving the second electric motor 11 of the electro-hydraulic motor 9 and an assist driving power for driving the first electric motor 5 of the electro-hydraulic pump 3, via the controller 7, as necessary.

Figure 2:
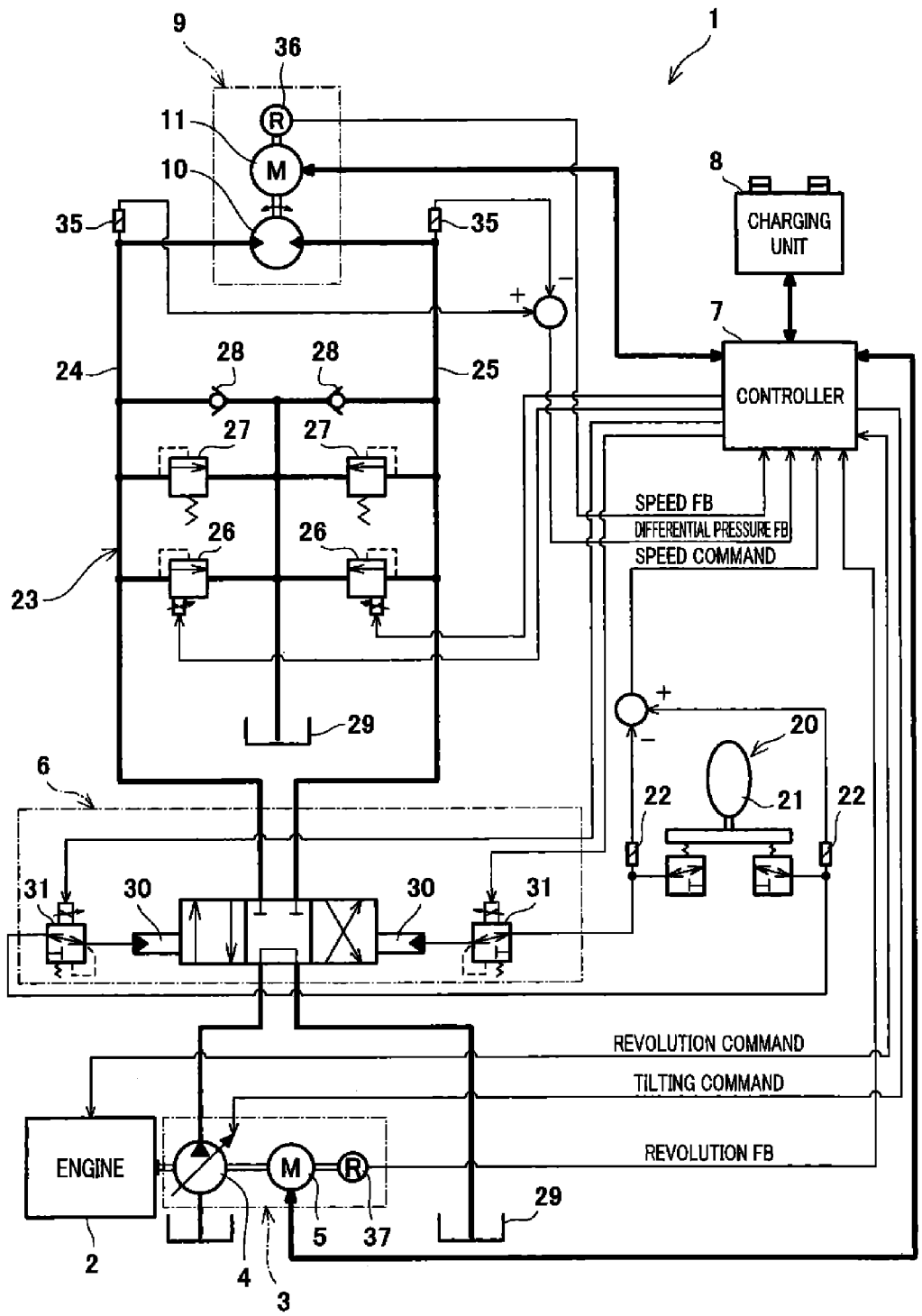
FIG. 2 is a hydraulic circuit diagram of the electro-hydraulic drive system of FIG. 1.
Figure 3A:
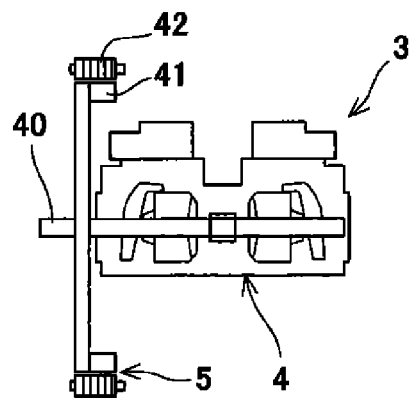
FIGS. 3A to 3D are side views schematically showing an example of a configuration of an electro-hydraulic integrated supply device in the electro-hydraulic drive system of FIG. 1.
Figure 3D:
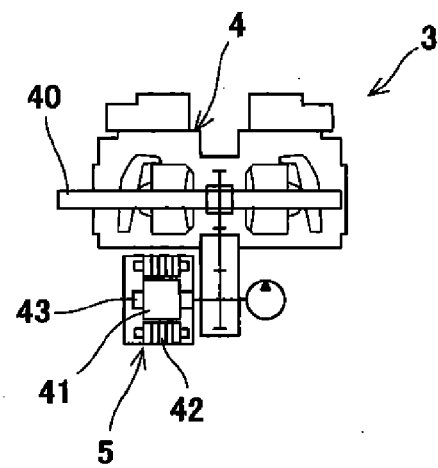
Figure 3B:
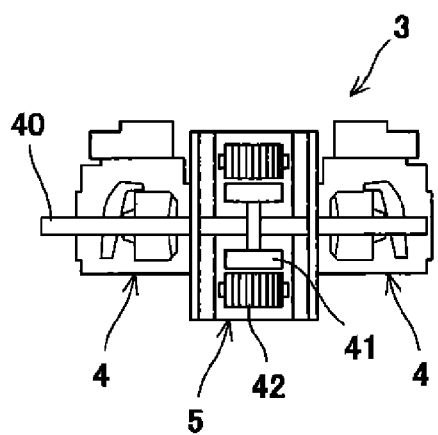
Figure 3C:
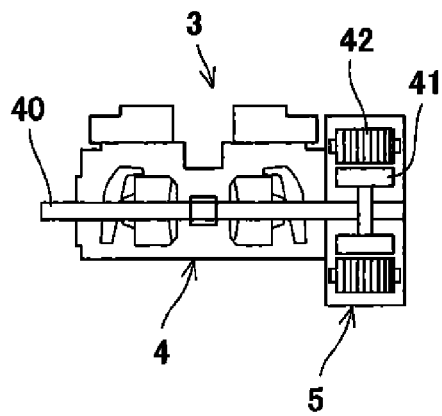

As shown in FIG. 2, a hydraulic circuit in the electro-hydraulic drive system 1 of the present embodiment is configured to determine a rotational direction and a rotational speed of the upper rotary body depending on a tilting direction, a tilting angle, a tilting speed, etc., of a tilting handle 21 attached to a remote control valve 20 which determines an operation amount such as the rotational direction, the rotational speed, etc., of the upper rotary body. Regarding an operation amount of the remote control valve 20, a differential pressure between right and left ports which is detected by a pressure sensor 22 is input to the controller 7 as a speed command (revolution command) for rotating the rotary body. Meanwhile, the hydraulic motor 10 of the electro-hydraulic motor 9 is also driven by the hydraulic oil discharged from the hydraulic pump 4 of the electro-hydraulic pump 3. The hydraulic oil is supplied from the hydraulic pump 4 to oil passages 24 and 25 in the hydraulic motor circuit 23 via the control valve 6. Through the oil passages 24 and 25, the hydraulic oil is supplied to a suction port of the hydraulic motor 10. The control valve 6 controls a flow rate of the hydraulic oil supplied to the hydraulic motor circuit 23. The suction port and a discharge port of the hydraulic motor 10 are reversed in position depending on the rotational direction.

The hydraulic motor circuit 23 is provided with electromagnetic relief valves 26 for avoiding a loss generated at a discharge side of the hydraulic motor 10, during deceleration of the hydraulic motor 10. The electromagnetic relief valves 26 are opened during deceleration of the hydraulic motor 10, thereby allowing the second electric motor 11 to recover regenerative electric power efficiently by utilizing inertia energy of the hydraulic motor 10. Since the hydraulic oil flows in opposite directions during forward rotation and backward rotation of the hydraulic motor 1, the electromagnetic relief valves 26 are directed to the oil passages 24 and 25, respectively. Furthermore, between the oil passages 24 and 25, there are provided relief valves 27 for operating so that the hydraulic oil is released to a tank 29 when a pressure exceeds a pressure during normal use, and check valves 28 for suctioning the oil from the tank 29 when the an amount of the oil circulated in the oil passages 24 and 25 is reduced.

In the present embodiment, to control an amount of the hydraulic oil by the control valve 6, electromagnetic pressure-reducing valves 31 are provided in the pilot ports 30 (rotary sections) of the control valve 6. To the electromagnetic pressure-reducing valves 31, a secondary pressure of the remote control valve 20 is guided as a primary pressure.

The control valve 6 is controlled by using the electromagnetic pressure-reducing valves 31 based on an opening degree control signal from the controller 7 so that the hydraulic oil with an amount corresponding to the operation amount of the remote control valve 20 is supplied to the hydraulic motor 10. The controller 7 controls the opening degrees of the electromagnetic pressure-reducing, valves 31 by controlling the control valve 6 with a pilot pressure derived by reducing a pilot oil pressure (secondary pressure) supplied from the remote control valve 20 by the electromagnetic pressure-reducing valves 31, in response to the operation amount of the remote control valve 20

Pressure sensors 35 are attached to the suction port and the discharge port of the hydraulic motor 10, respectively. A differential pressure between the pressures detected by the pressure sensors 35 is input to the controller 7 as a differential pressure feedback. Based on this differential pressure feedback, the controller 7 estimates torque to be generated in the hydraulic motor 10 (reverse torque when a signal of the differential pressure feedback is a negative signal).

The second electric motor 11 is connected to the charging unit 8 for storing the electric power via the controller 7. The controller 7 is configured to provide communication of the electric power between the charging unit 8 and the second electric motor 11. During acceleration of the hydraulic motor 10 to rotate the upper rotary body, the controller 7 discharges the electric power from the charging unit 8 and supplies the electric power to the second electric motor 11 cooperating with the hydraulic motor 10. On the other hand, during deceleration of the hydraulic motor 10, the controller 7 causes the second electric motor 11 to perform a regenerative action to brake the hydraulic motor 10 and charges the generated regenerative electric power into the charging unit 8. In this way, the controller 7 issues a rotation command to the second electric motor 11 cooperating with the hydraulic motor 10 during acceleration of the hydraulic motor 10, while the controller 7 issues a regenerative command to the second electric motor 11 to brake the hydraulic motor 10 during deceleration.

Further, the second electric motor 11 is attached with a revolution sensor 36. The revolution sensor 36 detects revolutions (number of revolutions) and inputs the detected revolutions to the controller 7 as speed feedback. Based on the speed feedback, the controller 7 calculates an acceleration velocity from a difference between actual revolutions and the speed command (revolution command) from the remote control valve 20.

The first electric motor 5 of the electro-hydraulic pump 3 is attached with a revolution sensor 37. The revolution sensor 37 detects revolutions (number of revolutions) and inputs the detected revolutions to the controller 7 as revolution feedback. Based on the revolution feedback, the controller 7 calculates an accurate discharge amount of the hydraulic pump 4. The controller 7 outputs a tilting command for tilting the hydraulic pump 4 and the revolution command to the engine 2.

Based on the speed command (revolution signal) of the differential pressure signal based on the operation amount of the remote control valve 20, the differential pressure feedback (torque signal) based on the differential pressure signal of the hydraulic motor 10, the speed feedback (actual revolutions) based on the revolution signal of the second electric motor 11, and the revolution feedback (actual discharge amount) based on the revolution signal of the first electric motor 5, the controller 7 rotates the second electric motor 11 to gain torque required for the electro-hydraulic motor 9 and sends the opening degree control signal to the electromagnetic pressure-reducing valves 31 to compensate for deficiency of the torque of the second electric motor 11, thereby controlling the control valve 6. Further, the controller 7 controls the tilting operation of the hydraulic pump 4 and the operating state of the first electric motor 5, as necessary.

The controller 7 controls the electromagnetic pressure-reducing valves 31 of the control valve 6 in such a manner that, when it is determined that the remote control valve 20 has been operated and the hydraulic motor 10 is to be accelerated, and electric energy which enables the operation of the second electric motor 11 is stored in the charging unit 8, the second electric motor 11 is driven preferentially by this electric energy. Thus, the hydraulic motor 10 driven by the hydraulic oil supplied via the control valve 6 controlled as described above compensates for deficiency of the torque.

On the other hand, when it is determined that the remote control valve 20 has been operated and the hydraulic motor 10 is to be decelerated, the controller 7 causes the second electric motor 11 to perform the regenerative reaction to convert inertia energy into electric energy to charge the regenerative electric power into the charging unit 8. In a case where the driving power generated in the engine 2 is more than necessary, the first electric motor 5 of the electro-hydraulic pump 3 is operated as the generator, and the generated electric power is charged into the charging unit 8.

As described above, since the controller 7 is capable of controlling the control valve 6, the first electric motor 5 and the second electric motor 11 based on the signal from the remote control valve 20, the signal from the electro-hydraulic pump 3 and the signal from the electro-hydraulic motor 9, the electro-hydraulic motor 9 and the electro-hydraulic pump 3 can be controlled efficiently depending on the operating states of the devices. Thus, it is possible to construct the electro-hydraulic drive system 1 with an improved energy efficiency. That is, depending on the operating state of the electro-hydraulic pump 3 and the operating state of the electro-hydraulic motor 9, the controller 7 controls the electromagnetic pressure-reducing valves 31 of the control valve 6 to adjust the amount of the hydraulic oil, and causes the first electric motor 5 and the second electric motor 11 to perform the power generation operation or the driving operation. In this way, the electro-hydraulic drive system 1 can realize an efficient operation using the electric power and the hydraulic pressure (fluid pressure).

FIG. 3 shows an example of a configuration of the electro-hydraulic pump 3 (electro-hydraulic integrated supply device). For example, in a case where two hydraulic pumps are arranged in series, in the example of FIG. 3A, the first electric motor 5 is disposed at the engine 2 side (at the left side in FIG. 3A) with respect to the hydraulic pump 4, a rotor 41 of the first electric motor 5 is attached to a rotary shaft 40 and a stator 42 is disposed at the outer periphery of the rotor 41. In the example of FIG. 3B, the first electric motor 5 is disposed between the two hydraulic pumps 4, the rotor 41 of the first electric motor 5 is attached to the rotary shaft 40 and the stator 42 is disposed at the outer periphery of the rotor 41. In the example of FIG. 3C, the first the first electric motor 5 is disposed at an opposite side of the engine 2 with respect to the hydraulic pump 4, the rotor 41 of the first electric motor 5 is attached to the rotary shaft 40 extended and the stator 42 is disposed at the outer periphery of the rotor 41. In the example of FIG. 3D, the first electric motor 5 is connected to a power take-off (hereinafter referred to as "PTO") mounted in the hydraulic pump 4, the rotor 41 is connected to a PTO shaft 43 and the stator 42 is disposed at the outré periphery of the rotor 41.

Figure 4A:
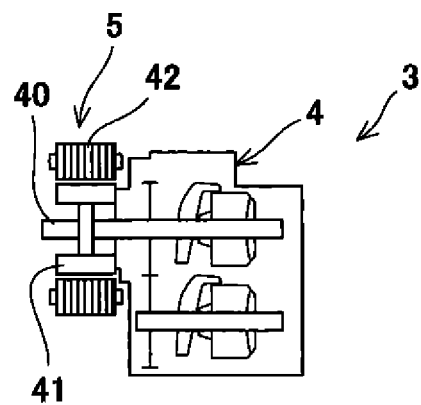
FIGS. 4A to 4C are side views schematically showing another example of the configuration of the electro-hydraulic integrated supply device in the electro-hydraulic drive system of FIG. 1.
Figure 4C:
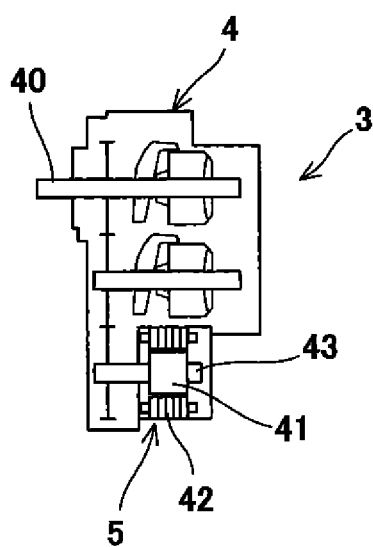
Figure 4B:
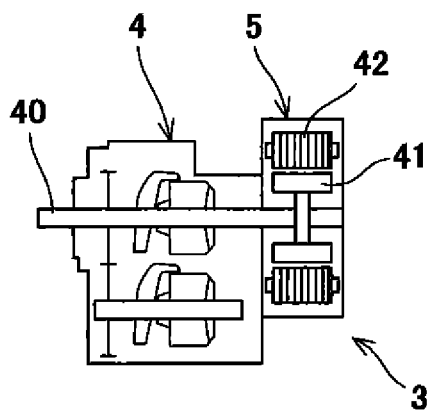

FIG. 4 shows another example of the configuration of the electro-hydraulic pump 3 (electro-hydraulic integrated supply device). For example, in a case where two hydraulic pumps 4 are arranged in parallel, in the example of FIG. 4A, the first electric motor 5 is disposed at the engine 2 side (at the left side in FIG. 4A) with respect to the hydraulic pump 4, the rotor 41 of the first electric motor 5 is attached to the rotary shaft 40 and the stator 42 is disposed at the outer periphery of the rotor 41. In the example of FIG. 4B, the first the first electric motor 5 is disposed at an opposite side of the engine 2 with respect to the hydraulic pump 4, the rotor 41 of the first electric motor 5 is attached to the rotary shaft 40 extended and the stator 42 is disposed at the outer periphery of the rotor 41. In the example of FIG. 4C, the first electric motor 5 is connected to the PTO mounted in the hydraulic pump 4, the rotor 41 is connected to the PTO shaft 43 and the stator 42 is disposed at the outer periphery of the rotor 41.

In accordance with the configurations shown in FIGS. 3 and 4, the hydraulic pump 4 can be provided with the first electric motor 5 without significantly changing a mounting structure with respect to the engine 2 as compared to a conventional configuration. Therefore, for example, by replacing the hydraulic pump in the work machine in use, with the electro-hydraulic pump 3 (electro-hydraulic integrated supply device), it becomes possible to easily implement an efficient operation while suppressing a fuel consumption amount in the drive system.

Figure 5:
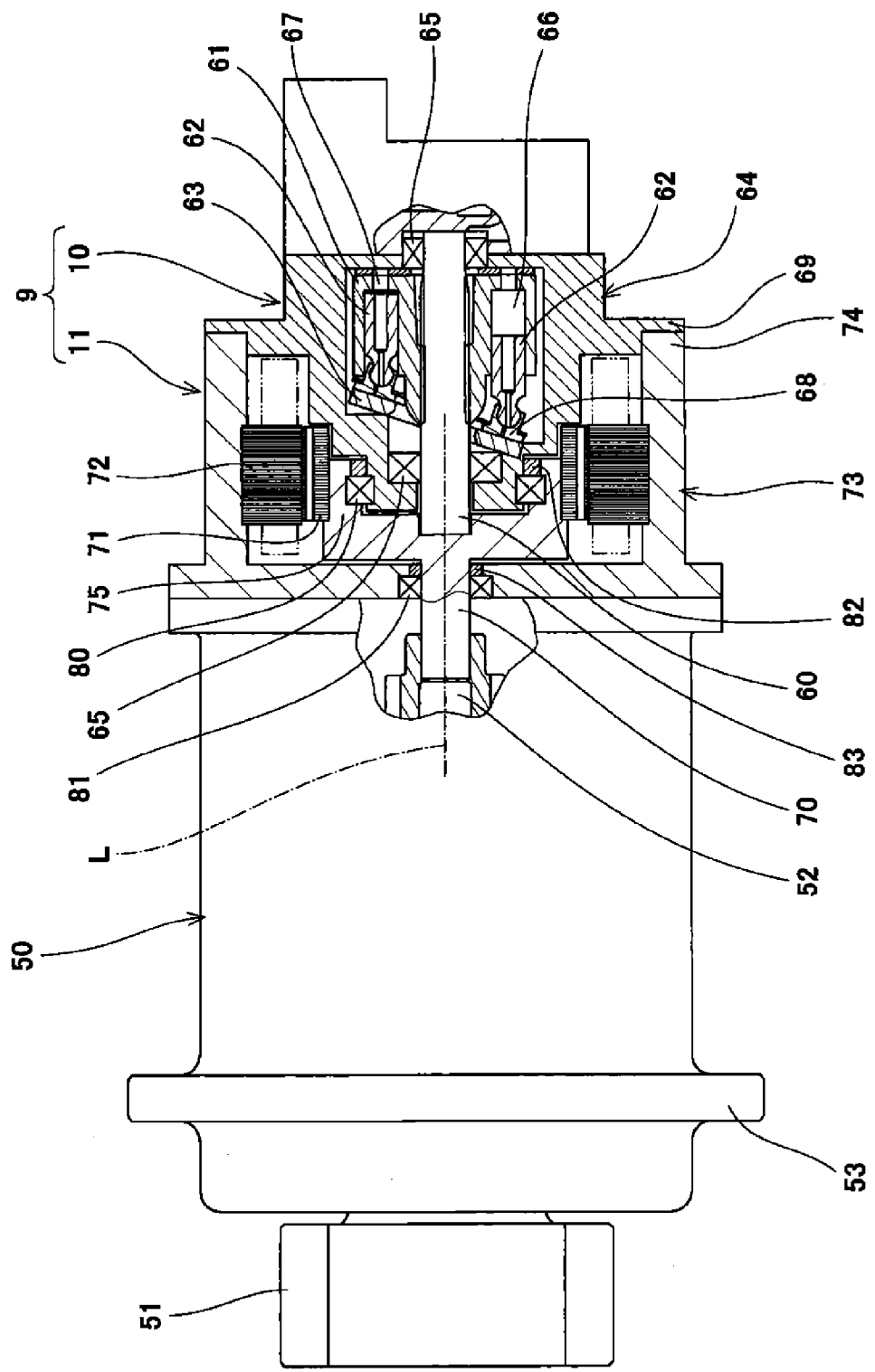
FIG. 5 is a cross-sectional view of an electro-hydraulic integrated drive device in the electro-hydraulic drive system of FIG. 1.

As shown in FIG. 5, in the present embodiment, the electro-hydraulic motor 9 (electro-hydraulic integrated drive device) includes the second electric motor 11 which is coupled to a reduction gear device 50 provided with a gear 51 for rotating the upper rotary body and rotates an output shaft 70 through which a driving power is transmitted to an input shaft 52 of the reduction gear device 50, and the hydraulic motor 10 for rotating a rotary shaft 60 disposed coaxially with the output shaft 70. The reduction gear device 50 of this example is mountable to a device by a mounting flange 53.

The hydraulic motor 10 is a swash plate piston motor of a fixed capacity type. The hydraulic motor 10 includes the rotary shaft 60, a cylinder block 61, a plurality of pistons 62 and a swash plate 63 and is accommodated in a casing 64. The rotary shaft 60 is disposed within the casing 64 in a state in which one end portion at the output shaft 70 side protrudes outward. The rotary shaft 60 is rotatably supported by the casing 14 at both end portions by bearings 65, respectively. The cylinder block 61 of a cylindrical shape is fitted to the other end portion of the rotary shaft 60 by splining or the like such that the cylinder block 61 is rotatable together with the rotary shaft 60. The cylinder block 61 is provided with a plurality of piston chambers 66 formed at equal intervals in a circumferential direction. Each piston chamber 66 opens at an end portion of the cylinder block 61 at the swash plate 63 side and opens at the other end portion of the cylinder block 61 via the cylinder port 67. The piston 62 is inserted into each piston chamber 66 from the direction of the swash plate 62.

The piston 42 reciprocates within the piston chamber 66. A spherical outer surface of one end portion of the piston 62 is mounted to a shoe 68 disposed at the swash plate 63. The swash plate 63 is disposed at the rotary shaft 60 at the output shaft 70 side rather than the cylinder block 61 and is mounted to the casing 64 with a predetermination inclination angle with respect to an axis L of the rotary shaft 60.

In accordance with the hydraulic motor 10 configured as described above, the hydraulic oil is supplied to the piston chamber 66 via the suction port, and the supplied hydraulic oil is discharged from the piston chamber 66 via the discharge port, thereby allowing the piston 62 to reciprocate. The swash plate 63 is inclined with the predetermined inclination angle. Because of this, when the piston 62 reciprocates, the shoe 68 slides on the swash plate 63 and the cylinder block 61 rotates around the axis L. Since the cylinder block 61 rotates together with the rotary shaft 60, the rotary shaft 60 rotates according to the rotation of the cylinder block 61.

The second electric motor 11 is mounted integrally to the hydraulic motor 10 configured as described above. The second electric motor 11 is a three-phase synchronous electric motor. The second electric motor 11 includes the output shaft 70, the rotator 71, and the stator 72, which are accommodated in a housing 3. The housing 3 has a bottomed cylinder shape and is positioned at an outer peripheral of the casing 64 of the hydraulic motor 10. An outward flange 69 protruding radially outward is provided over the entire axial intermediate portion of an outer peripheral surface of the casing 64, and an opening end portion 74 of the housing 73 is fastened to the outward flange 69.

In the above described manner, the second electric motor 11 is mounted integrally to the outer periphery of the hydraulic motor 10 in such a manner that a portion of the electric motor 11 where the rotary shaft 60 of the hydraulic motor 10 protrudes outward is accommodated in the housing 73 coaxially with the output shaft 70 and these are coupled together by splining, or the like, to be rotatable together, and the second electric motor 11 is positioned to surround the hydraulic motor 10.

A support section 75 of the rotator 71 is supported at the end portion of the casing 64 at the output shaft 70 side by means a bearing 80 in a location spaced apart a predetermined gap from the outer periphery. In the present embodiment, the support section 75 of the rotor 71 is provided integrally with the output shaft 70, and this portion of the output shaft 70 is supported by the housing 73 by means of a bearing 81.

A seal member 82 is provided at the bearing 80 in a location of the second electric motor side (stator side) to seal a gap between the support section 75 of the rotor 71 and the casing 64. The seal member 82 provided at the bearing 80 in the location of the second electric motor side prevents the oil in the interior of the hydraulic motor 10 from leaking into a space between the rotor 71 and the stator 72 in the second electric motor 11 via the bearing 80. In addition to this, a seal member 83 is provided at the bearing 81 in a location at the second electric motor side. The seal member 83 provided at the bearing 81 in the location at the second electric motor side prevents the oil in the interior of the reduction gear device 50 from leaking into a space between the rotor 71 and the stator 72 in the second electric motor 11 via the bearing 81. In this way, it is possible to prevent the oil from leaking into the space between the rotor and the stator in the second electric motor 11, which would otherwise degrade performance of the electric motor.

In accordance with the electro-hydraulic motor 9 configured as described above, the second electric motor 11 can be mounted compactly to the hydraulic motor 10, which can reduce components in number and hence cost. In addition, since the oil in the hydraulic motor 10 does not leak into the interior of the second electric motor 10, the operation can be carried out without reducing the efficiency of the hydraulic motor 10 and the second electric motor 11. Moreover, since a driving ratio or like between the hydraulic motor 10 and the second electric motor 11 is controlled efficiently, an energy efficiency can be improved.

As described above, in accordance with the electro-hydraulic drive system 1, the controller 7 can perform selective control for the hydraulic pump 4 and the first electric motor 5, the control valve 6, or the hydraulic motor 10 and the second electric motor 11 depending on the operating states of the work machine including the upper rotary body, etc., by using the electro-hydraulic pump 3 (supply device) including the hydraulic pump 4 and the first electric motor 5 and the electro-hydraulic motor 9 (drive device) including the hydraulic motor 10 and the second electric motor 11. Therefore, the electro-hydraulic pump 3 and the electro-hydraulic motor 9 can be operated efficiently depending on the operating states of the devices. As a result, it is possible to construct the electro-hydraulic drive system 1 with an improved energy efficiency.

In addition, even when the second electric motor 11 of the electro-hydraulic motor 9 is disenabled, the hydraulic motor 10 can drive the upper rotary body, etc. Thus, it becomes possible to construct the electro-hydraulic drive system 1 with high reliability. In addition, since each of the electro-hydraulic pump 3 and the electro-hydraulic motor 9 is reduced in size and has an integral configuration, it becomes possible to construct the electro-hydraulic drive system 1 with high reliability and low cost.

Although in the present embodiment, the hydraulic shovel including the hydraulic motor 10, the traveling hydraulic motor, the upper rotary body, etc., has been described as the work machine, the work machine is not limited to the above described embodiment, so long as that work machine uses the electro-hydraulic supply device and the electro-hydraulic drive device.

Although in the present embodiment, the electro-hydraulic pump 3 has an integral configuration and the electro-hydraulic motor 9 has an integral configuration, they need not have the integral configuration. The hydraulic pump 4 and the first electric motor 5 may be arranged in parallel, and the hydraulic motor 10 and the second electric motor 11 may be arranged in parallel.

Moreover, the present embodiment is merely exemplary, and can be changed within a spirit of a scope of the invention. The present invention is not limited to the above described embodiment.

INDUSTRIAL APPLICABILITY

An electro-hydraulic drive system of the present invention is used in a work machine configured such that a structure body is driven by a hydraulic motor and an electric motor.

REFERENCE SIGNS LISTS 1 electro-hydraulic drive system
2 engine (driving power source)
3 electro-hydraulic pump (supply device)
4 hydraulic pump
5 first electric motor
6 control valve
7 controller
8 charging unit
9 electro-hydraulic motor (drive device)
10 hydraulic motor
11 second electric motor
22, 35 pressure sensor
36, 37 revolution sensor
60 rotary shaft
62 piston
63 swash plate
64 casing
65 bearing
70 output shaft
71 rotor
72 stator
73 housing
82, 83 seal member
L axis

The invention claimed is:

1. An electro-hydraulic drive system for a work machine which drives a structure body by controlling a flow rate of a hydraulic fluid by a control valve, comprising:
a supply device which includes a hydraulic pump driven by a driving power source, and a first electric motor, and supplies the hydraulic fluid;

a drive device which includes a hydraulic motor rotated by the hydraulic fluid supplied from the supply device, and a second electric motor, and drives the structure body; and a controller which decides an operating state of the first electric motor and an operating state of the second electric motor, based on a load of the supply device and a load of the drive device;

wherein the first electric motor has a first generator function of converting driving power transmitted from the driving power source into electric energy, and a drive unit function of assisting driving of the hydraulic pump by utilizing the electric energy, wherein the second electric motor has a second generator function of converting inertia energy into the electric energy during deceleration of the hydraulic motor and a drive unit function of assisting driving of the hydraulic motor by utilizing the electric energy; and wherein the controller performs control to operate each of the first electric motor and the second electric motor as a generator or a drive unit based on a state of charge in a charging unit which stores electric power generated by the first and second generator functions, the load of the supply device, and the load of the drive device.

2. An electro-hydraulic drive system for a work machine which drives a structure body by controlling a flow rate of a hydraulic fluid by a control valve, comprising:

a supply device which includes a hydraulic pump driven by the driving power source, and a first electric motor, and supplies the hydraulic fluid;

a drive device which includes a hydraulic motor rotated by the hydraulic fluid supplied from the supply device, and a second electric motor, and drives the structure body; and a controller which decides an operating state of the first electric motor and an operating state of the second electric motor, based on a load of the supply device and a load of the drive device;

wherein the drive device is configured such that the hydraulic motor and the second electric motor are integral with each other;

wherein the second electric motor includes a rotor connected to a rotary shaft of the hydraulic motor and a stator disposed on an outer periphery of the rotor; and wherein the rotor is disposed to surround an outer periphery of a casing of the hydraulic motor such that the rotor is spaced apart a predetermined gap from the outer periphery of the casing; and wherein a bearing for supporting the rotor on the casing and a seal member for sealing the gap between the rotor and the casing are disposed between the rotor and the casing.

3. The electro-hydraulic drive system for the work machine according to claim 1,
wherein the supply device is configured such that the hydraulic pump and the first electric motor are integral with each other.

4. The electro-hydraulic drive system for the work machine according to claim 1,
wherein the drive device is configured such that the hydraulic motor and the second electric motor are integral with each other;
wherein the second electric motor includes a rotor connected to a rotary shaft of the hydraulic motor and a stator disposed on an outer periphery of the rotor; and
wherein the rotor is disposed to surround an outer periphery of a casing of the hydraulic motor such that the rotor is spaced apart a predetermined gap from the outer periphery of the casing; and
wherein a bearing for supporting the rotor on the casing and a seal member for sealing the gap between the rotor and the casing are disposed between the rotor and the casing.

5. The electro-hydraulic drive system for the work machine according to claim 2,
wherein the supply device is configured such that the hydraulic pump and the first electric motor are integral with each other.

6. The electro-hydraulic drive system for the work machine according to claim 1,
wherein the supply device is configured such that the hydraulic pump and the first electric motor are integral with each other.

7. The electro-hydraulic drive system for the work machine according to claim 4,
wherein the supply device is configured such that the hydraulic pump and the first electric motor are integral with each other.

* * * * *